United States Patent
Hamilton

(10) Patent No.: US 6,757,259 B1
(45) Date of Patent: Jun. 29, 2004

(54) CONTROL OF INTERNET BASED VIDEO CONFERENCING

(75) Inventor: Chris Hamilton, Montclair, NJ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/372,884

(22) Filed: Aug. 12, 1999

(51) Int. Cl.[7] .............................................. H04L 12/18
(52) U.S. Cl. .................... 370/260; 370/401; 379/202.01
(58) Field of Search ................................ 370/260, 263, 370/264, 265, 401, 402, 407, 390, 392; 379/202.01; 709/204

(56) References Cited

U.S. PATENT DOCUMENTS

| | | | | |
|---|---|---|---|---|
| 5,751,338 A | * | 5/1998 | Ludwig, Jr. .............. | 348/14.12 |
| 5,828,743 A | * | 10/1998 | Pinnell et al. .............. | 379/204 |
| 5,916,302 A | * | 6/1999 | Dunn et al. .................. | 709/204 |
| 6,011,782 A | * | 1/2000 | DeSimone et al. ......... | 370/260 |
| 6,091,714 A | * | 7/2000 | Sensel et al. ............... | 370/260 |
| 6,144,667 A | * | 11/2000 | Doshi et al. ................. | 370/401 |
| 6,157,635 A | * | 12/2000 | Wang et al. ................. | 370/352 |
| 6,219,412 B1 | * | 4/2001 | Wellner et al. ........ | 379/202.01 |
| 6,330,022 B1 | * | 12/2001 | Seligmann ............... | 348/14.08 |
| 6,332,153 B1 | * | 12/2001 | Cohen ........................ | 709/204 |
| 6,353,848 B1 | * | 3/2002 | Morris ........................ | 709/203 |
| 6,377,570 B1 | * | 4/2002 | Vaziri et al. ................ | 370/352 |
| 6,404,745 B1 | * | 6/2002 | O'Neil et al. ............... | 370/260 |

* cited by examiner

*Primary Examiner*—Min Jung
(74) *Attorney, Agent, or Firm*—Blakely, Sokoloff, Taylor & Zafman LLP

(57) ABSTRACT

An improved video conferencing system utilizes IP addresses received over a data network in order to determine whether other conferee terminals should receive video, audio, or both.

11 Claims, 1 Drawing Sheet

CONTROL OF INTERNET BASED VIDEO CONFERENCING

TECHNICAL FIELD

This invention relates to video conferencing, and more particularly, to an improved method and apparatus for controlling and dynamically configuring video conferencing and similar systems that preferably operate over a data network such as the Internet.

BACKGROUND OF THE INVENTION

Audio and video conferencing have become prevalent in the business community, particularly as larger bandwidth communications links such as T1, etc. have become common. In an audio conferencing system, a plurality of inputs are summed together, and each conferee receives the sum of all of the other inputs. In a video conferencing system, there usually exists an audio channel that operates in accordance with the foregoing description of an audio conference, and a video channel that is configured differently.

The video channel can not simply sum numerous inputs and transmit the sum to a receiving terminal because unlike audio, the sum of numerous video inputs would be meaningless. Accordingly, the video output at each conferencing terminal operates in a different manner. Specifically, the video output may include video from all other conferees, or it may include the video image of a selected one or more conferees.

One drawback of such systems is that they are usually inflexible and arranged for a static configuration. For example, the video and audio information is to be displayed at each terminal is fixed, and no dynamic adaptation takes place during the conference. Additionally, with the increased use of data networks, such as the Internet, to implement video conferencing, there exists the possibility to implement services that are based upon the digital characteristics of the Internet.

In view of the above, there exists a need in the art for a more flexible arrangement to implement video conferencing, particularly when the Internet or a similar data network is employed.

SUMMARY OF THE INVENTION

The above and other problems of the prior art are overcome in accordance with the present invention which relates to a technique of utilizing Internet addresses to determine parameters for a video conference. In accordance with the invention, the IP address is recognized by the conferencing system implementing the video conference over the Internet. The system may then be arranged to customize the receipt by a terminal of video and/or audio data from the Internet based conference bridge.

DETAILED DESCRIPTION OF THE PREFERRED EMBODIMENT

Figure 1:
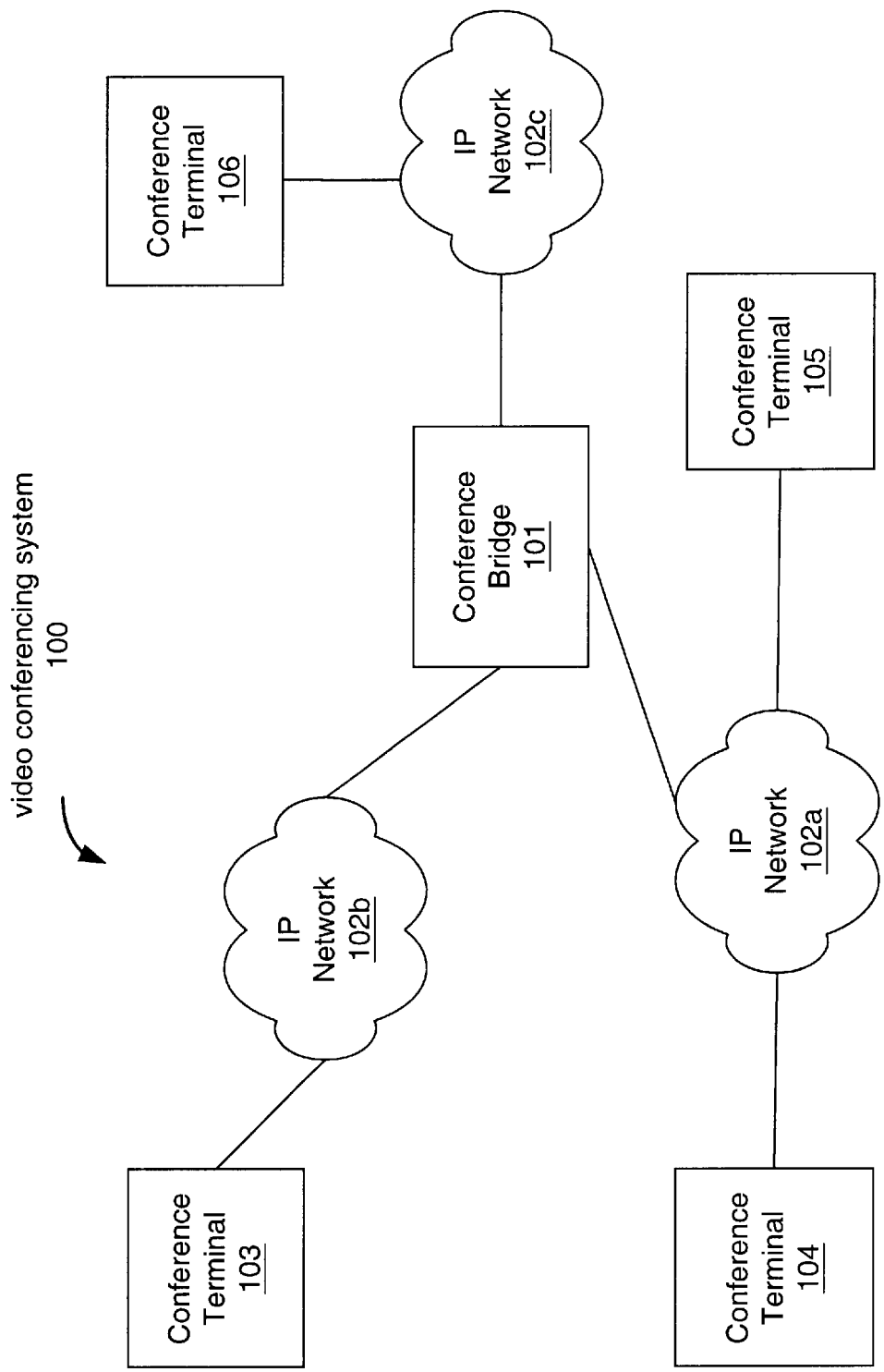
FIG. 1 depicts an exemplary conference arrangement in accordance with the present invention.

FIG. 1 shows a high level conceptual block diagram of an Internet based video conferencing system. The arrangement of FIG. 1 includes a conference bridge 101, IP network 102, and exemplary conference terminals 103–106.

In operation, the conference bridge 101 receives audio and compressed video over IP network 102 in accordance with standard known communications techniques for implementing video conferencing over the Internet. A commercially available product known as CU-SeeMe has been available for years, and can operate on a server for implementation of the conference bridge.

The conference bridge has the ability to extract from transmitted data packets the IP address from which such packets originated. The IP address is used in order to configure the parameters of each of the conferencing stations. Implementation of such an arrangement is accomplished by maintaining a table at the conference bridge that defines attributes of a conferee's terminal based upon the IP address.

One example is that a terminal participating in the video conference may request that it receive video only from certain transmitting terminals, and audio and video from other transmitting terminals. Another example is that a terminal may request that any calling terminal not having a specified IP address not be allowed to connect to it. This could prevent telemarketing organizations from establishing video calls to potential customers that may not be interested in receiving such calls.

In operation, the foregoing may be implemented by a relatively small software module within conference bridge 101 which checks the captured IP address of incoming packets and performs a table lookup to ascertain the appropriate attributes (e.g. whether transmission to any intended recipient has been blocked by such recipient). The processing may then proceed by either transmitting the packet to the appropriate destination or discarding the packet. It is noted that in the case where the intended destination terminal has turned off its video only, the arriving packets should be checked not only for the destination address but also for the type of packet (e.g. voice or video).

It is also noted that the transmitting terminal may have authority to set the parameters regarding to whom the video should go. For example, consider a video conference taking place among terminals 102–106. The user of terminal 104 may desire that the user of terminal 103 does not receive video, but instead receives only audio. Regarding the remaining conferencing terminals 105–106, terminal 104 determines that all of its transmitted video and audio is to be received by both terminals.

In the foregoing example, terminal 103 transmits the appropriate information to advise conference system 101 of the desire to block video from being sent to terminal 104, the information may be in the form of a configuration packet that specifies the members in the video conference, and the parameters of each member (e.g. voice only, video only, voice and video).

As packets are received from each of the conferencing terminals 103–106, both the originating address and the destination address are checked. Additionally, the type of packet may be checked (e.g. audio or video). A table lookup then facilitates the determination as to which receiving terminals should receive the packet for the purpose of reconstructing the video images.

Any combination of receiving or transmitting terminals may also be used in the determination of whether particular packets are received by certain terminals. For example, the system could determine that only packets from a certain conferee to a particular other conferee are to be received based upon the IP address. Nonetheless, audio packets may have a different set of attributes for transmission and receipt.

The particular tables which define which terminals will receive audio and/or video may dynamically change during the course of the conference. Thus, for example, consider a conference whereby all four terminals 103 through 106 are in full voice and video communication with one another. If two terminals desire to cutoff their video communication from the other two so that they can review a confidential document, a conference may be temporarily reconfigured so that only the audio is transmitted to the two excluded terminals, while the video is blocked. Such an arrangement may be implemented by simply having the transmitting terminal send to the conference bridge the two IP addresses of the terminals to which video should not be transmitted. The conference system will then block the video from being so transmitted.

While the above describes the preferred embodiment, various other, modifications or additions will be apparent of those of skill in the art. Such modifications and additions are intended to be covered by the following claims.

What is claimed:

1. A video conferencing system comprising:
   a conference bridge,
   a plurality of conference terminals, each connected to the conference bridge over a data network and capable of receiving and transmitting audio and video conferencing signals to and from said conference bridge over said data network; and
   means at said conference bridge to read addresses used by said data network to identify said conference terminals, to store information to identify which terminals are to receive audio packets and which terminals are to receive video packets, and to use the stored information to determine whether to prohibit transmission of either audio or video packets from or to one or more of the plurality of conference terminals.

2. The system of claim 1 further including means for distinguishing between an audio and video packet, and wherein said means for reading includes means for detecting the address from which a packet originated and for prohibiting transmission of packets originating from certain addresses if said packets are video packets.

3. The system of claim 2 wherein said means for prohibiting transmission includes means for prohibiting transmission to specified destination terminals while permitting transmission to destination terminals that are not specified.

4. The system of claim 1 further including means for distinguishing between an audio and video packet, and wherein said means for reading includes means for detecting the address from which a packet originated and for prohibiting transmission of packets originating from certain addresses if said packets are audio packets.

5. The system of claims 2 or 4 wherein said means for prohibiting transmission includes means for removing prohibition after a specified event.

6. The system of claim 1 wherein the means for determining whether to prohibit transmission includes means for prohibiting transmission from specified origination terminals while permitting transmission from origination terminals that are not specified.

7. The system of claim 1 wherein the means for determining whether to prohibit transmission includes means for prohibiting transmission from all origination terminals.

8. A method comprising:
   determining which of a plurality of conferencing terminals are to receive audio packets;
   determining which of said plurality of conferencing terminals are to receive video packets;
   storing, at a conference bridge, tables indicative of the terminal addresses corresponding to terminals that are to receive video packets and to the terminals that are to receive audio packets;
   transmitting from the terminals video and audio packets;
   receiving, at the conference bridge, audio and video packets transmitted from the terminals; and
   performing table look-ups to ascertain which terminals are to receive the video packets and which terminals are to receive the audio packets.

9. The method of claim 8 further comprising transmitting from each terminal the addresses of terminals from which said each terminal is to receive video packets.

10. The method of claim 9 wherein performing table look-ups to ascertain which terminals are to receive the video packets, and which terminals are to receive the audio packets comprises detecting whether a packet is a video packet and whether the packet is destined for a particular destination.

11. The method of claim 8 further comprising transmitting from each terminal the addresses of the terminals that are to receive audio packets.

* * * * *